Aug. 7, 1923.
W. C. HALL
WEIGHING MACHINE
Filed May 23, 1921
1,464,422
4 Sheets-Sheet 1
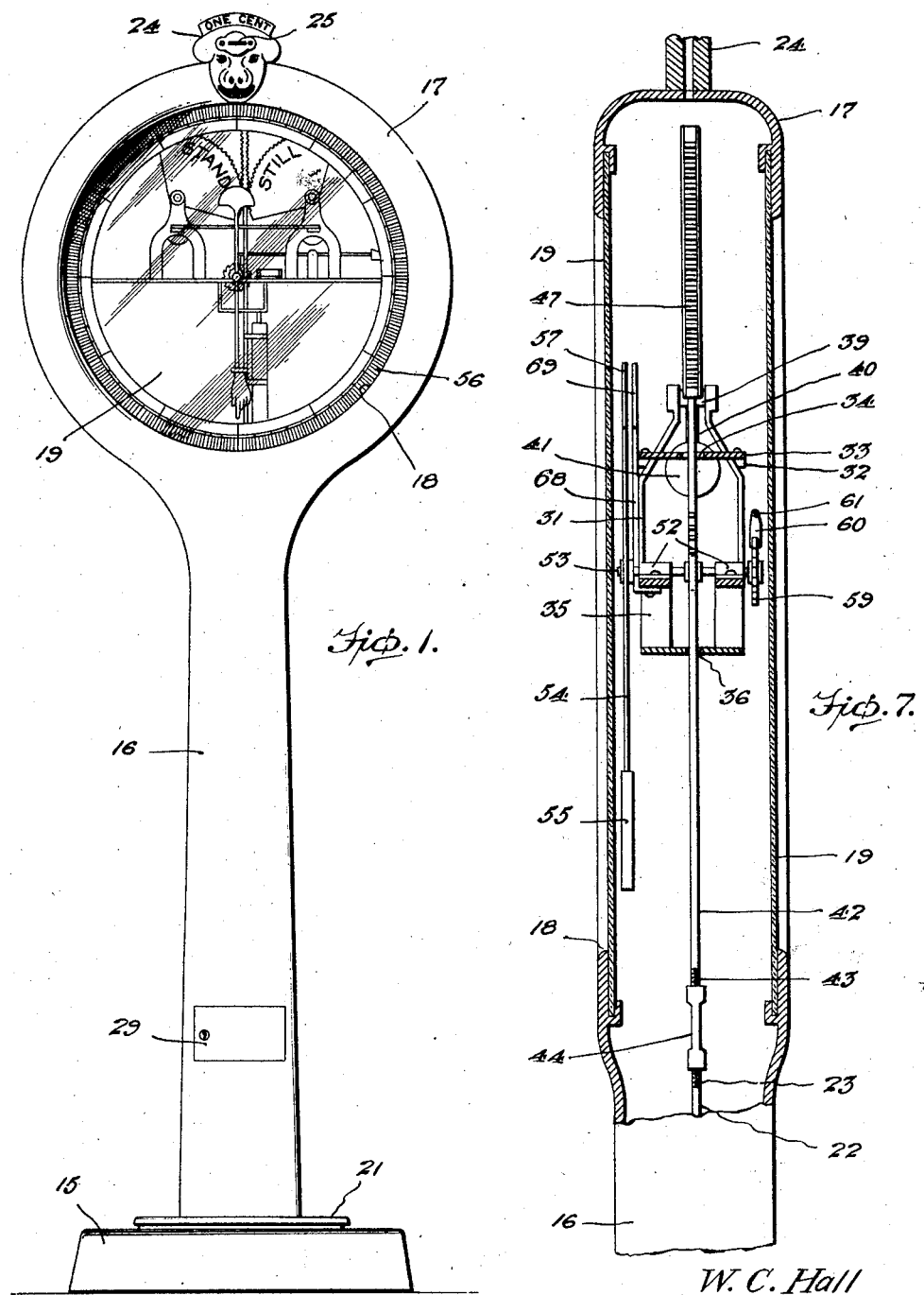
W. C. Hall
INVENTOR
BY Victor J. Evans
ATTORNEY
WITNESS:

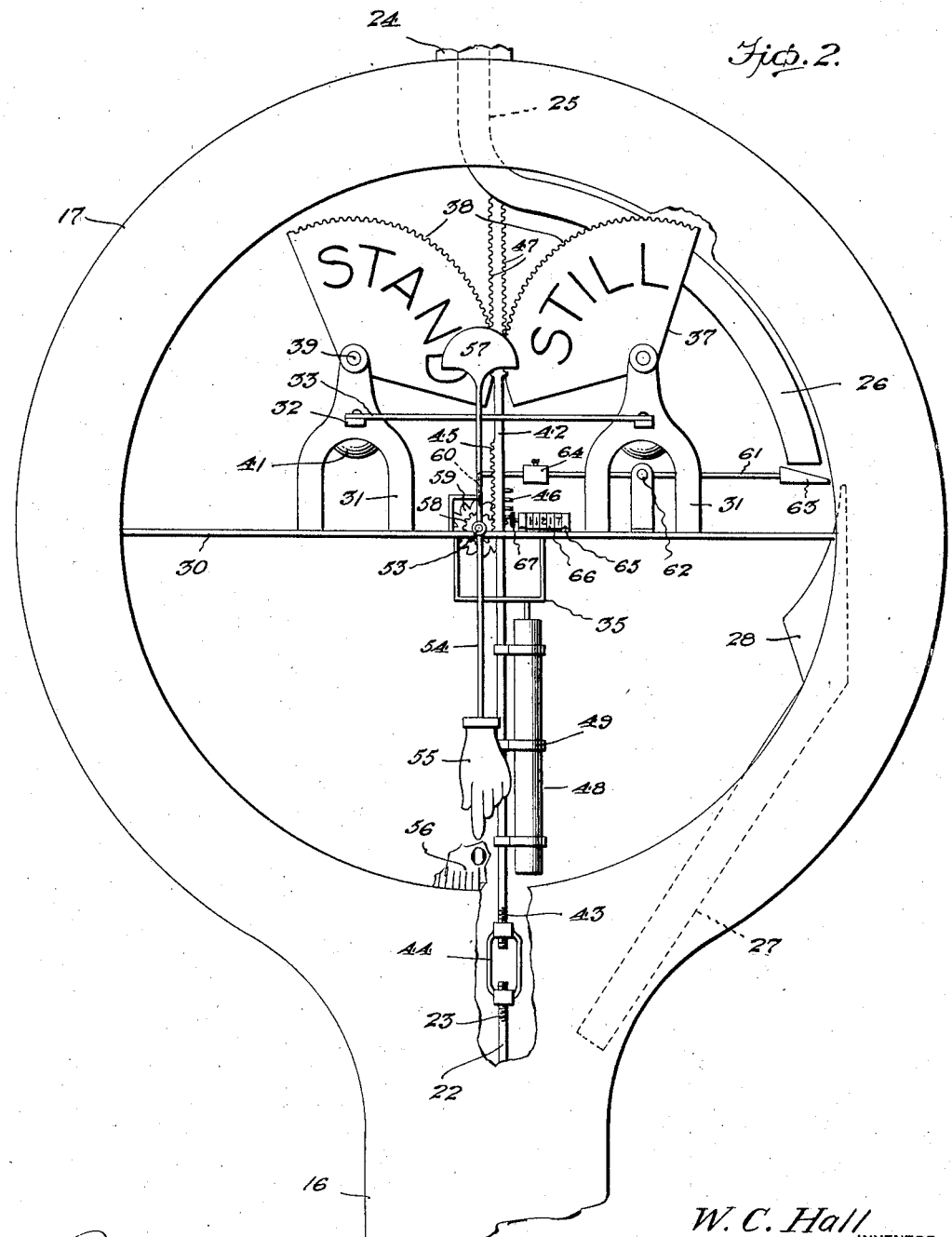

Aug. 7, 1923.
W. C. HALL
WEIGHING MACHINE
Filed May 23, 1921
1,464,422
4 Sheets-Sheet 3
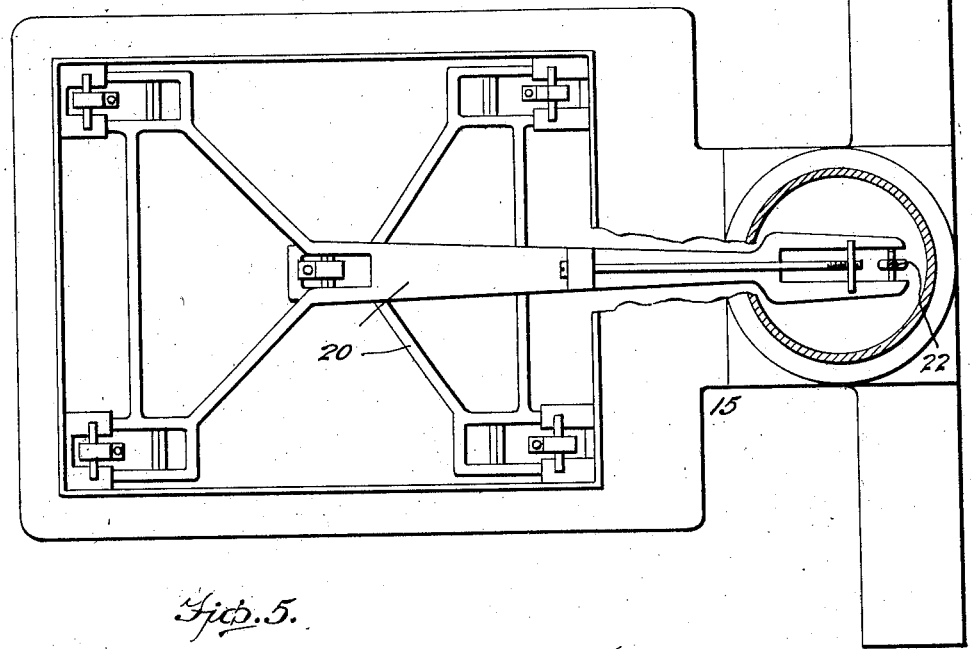
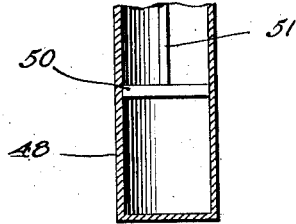
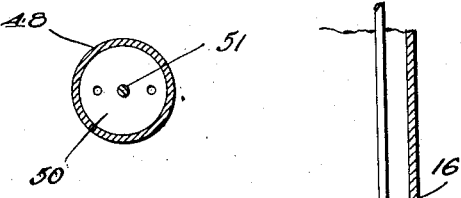
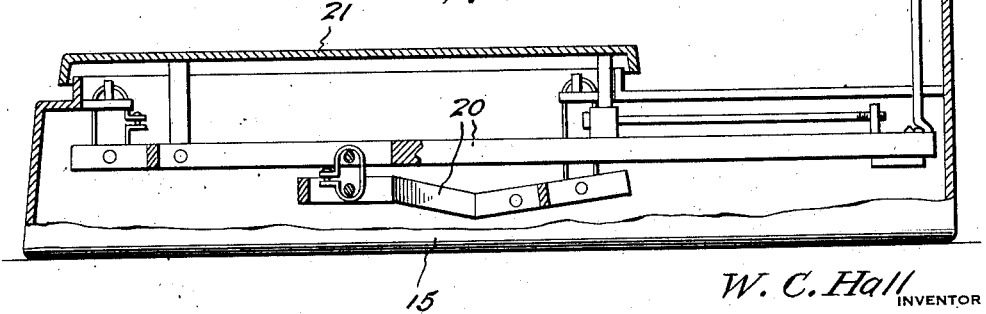
W. C. Hall INVENTOR
BY Victor J. Evans ATTORNEY
WITNESS:

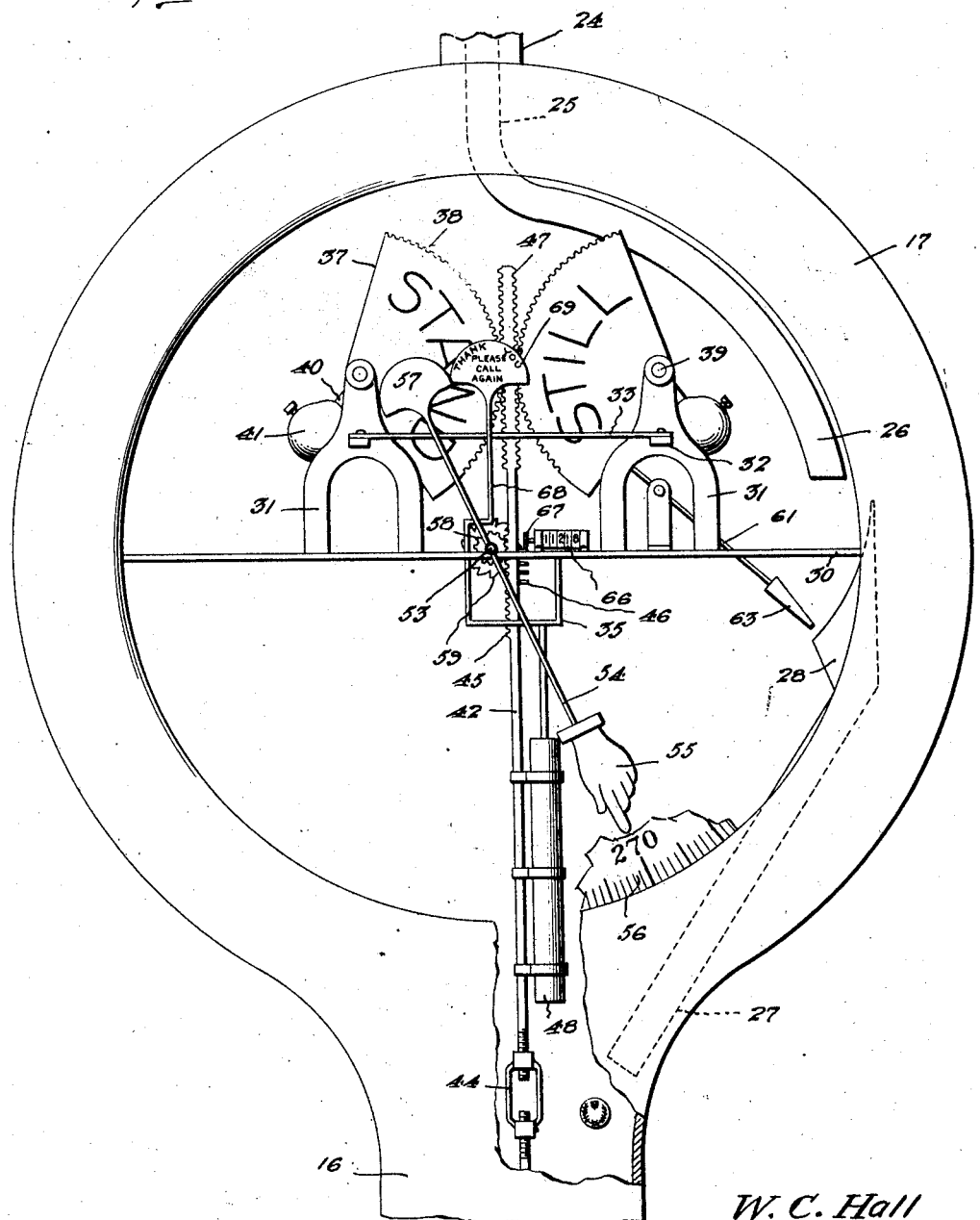

Patented Aug. 7, 1923.

1,464,422

UNITED STATES PATENT OFFICE.

WILLIAM C. HALL, OF GREENVILLE, SOUTH CAROLINA.

WEIGHING MACHINE.

Application filed May 23, 1921. Serial No. 471,688.

*To all whom it may concern:*

Be it known that I, WILLIAM C. HALL, a citizen of the United States, residing at Greenville, in the county of Greenville and State of South Carolina, have invented new and useful Improvements in Weighing Machines, of which the following is a specification.

This invention relates to weighing machines of the platform type in which the weight of a person standing upon the scale is ascertained upon depositing a coin, and has for its object the provision of a weighing machine of this character which is so constructed that no springs are involved in its construction and which will therefore be more accurate in determining the weight.

An important object is the provision of a coin controlled springless weighing machine of this character which will be entirely automatic in action and in which the construction is such that the various movements of the parts will be quickened so as to prevent injury to the mechanism on account of any such movement.

Still another object is the provision of a weighing machine of this character which will be extremely attractive in appearance and in which the head portion is covered on both sides with transparent material, preferably plate glass, whereby the person using or patronizing the scale may see the operating mechanism.

A further object is the provision of a weighing device of this character which will be comparatively simple and inexpensive in manufacture, easy in operation, not likely to get out of order, efficient and accurate in use, durable in service and a general improvement in the art.

With the above and other objects and advantages in view, the invention consists in the details of construction to be hereinafter more fully described and claimed, and illustrated in the accompanying drawings, in which:

Figure 1 is a front elevation of my scales showing it complete.

Figure 2 is an enlarged faced view of the head portion.

Figure 3 is a plan view of the platform portion with the platform removed.

Figure 4 is a longitudinal sectional view through the platform portion and lower portion of the pedestal.

Figures 5 and 6 are detail views of the mechanism within the platform portion.

Figure 7 is a vertical longitudinal sectional view through the pedestal and head portion.

Figure 8 is a view similar to Figure 2, showing the parts in weighing position and showing the coin as being discharged from its scoop.

Referring more particularly to the drawings I have shown my device as comprising a casing which includes a base portion 15, a pedestal portion 16 rising from the base, and a head portion 17 which is provided at its front and back with a large opening 18 covered by a disk 19 of plate glass. Mounted within the base portion 15 is the usual set of levers and links designated by the numeral 20, which supports the usual type of platform 21 upon which stands the person desiring to be weighed. The details of construction of the lever and link mechanism 20 is not believed necessary as such construction is old and well known in the art. These levers and links 20 are so arranged and correlated as to exert a downward pull upon a rod 22 when a weight is placed upon the platform 21. This rod 22 extends upwardly throughout the length of the pedestal portion 16 of the device and has its upper end threaded as indicated at 23, this threaded end terminating adjacent the juncture of the head 17 with the pedestal.

The head portion 17 is provided at its top with an extension 24 having a coin receiving slot 25 therein which communicates with a coin chute 26 which extends downwardly and within one side portion of the head 17, this chute terminating slightly above the center of the head 17 as shown. Also located within the head 17 is a coin chute 27 which has a funnel shaped receiving end 28 disposed somewhat below the lower end of the chute 26 as clearly shown. This chute 27 extends to the upper portion of and discharges into the pedestal portion 16 of the machine. It is of course understood that the pedestal portion 16 is hollow. Within the base portion 15 is provided a door 29 normally closing a receptacle which is adapted to receive coins inserted within the machine, and it is to be understood that this receptacle is so positioned and has its entrance so arranged as not to interfere with the action of the lever and link mechanism 20. This receptacle may be made of any desired size.

Extending transversely across the interior of the head portion 17 are spaced bars 30 upon which are mounted spaced uprights supporting brackets 31 which carry lugs 32 projecting from their sides. Secured to these lugs 32 is a bifurcated brace bar 33 which has its central portion formed with a hole 34. Secured upon the under side of the bars 30 and depending therefrom at the centers thereof is a U-shaped frame 35 which has its bight portion provided with a hole 36 aligning with the hole 34. Associated with each of the upright supports 31 is a segment 37 having a toothed periphery 38 and carrying at its opposite side trunnions 39 revolvably engaged within holes in the supports 31 as shown. Depending from the segment 37 are arms 40 which carry weights 41 movable within the spaces between the lower portions of the supports 31.

Movable vertically within the head portion 17 at the center thereof is a rod 42 which is guided within the holes 36 and 34 and which passes between the transverse bars 30. At its lower end this rod 42 is threaded as indicated at 43 and engaged upon this lower threaded end is a turn buckle structure 44 which is also connected with a threaded upper end 23 of the rod 22. At a point substantially between the bars 30 the rod 42 is formed on opposite sides with rack teeth 45 and 46 for a purpose to be described and at its upper portion the rod 42 is formed on opposite sides with rack teeth 47 which mesh with the toothed peripheries of the segments 38. This rod 42 is adapted to be moved when a person to be weighed stands upon a platform 21. In order to cushion the movement of the rod 42, or rather to prevent too free movement thereof, I provide a cylinder 48 which is carried by the rod 42 as by means of suitable clips or brake bands 49 and this cylinder 48 co-operates with the piston 50 disposed therein and carried by a piston rod 51 which depends from the bracket 35. This cylinder 48 has both ends closed except that the upper end is perforated for the passage of the rod 51, and the cylinder may be filled with oil or other liquid if desired, and it is of course necessary that the piston 50 be provided with one or more suitable holes whereby to permit the oil or other liquid within the cylinder to pass from one side of the piston to the other as will be readily understood.

Mounted upon the bars 30 near the centers thereof are bearings 52 within which is journaled a shaft 53 which carries at one end an indicator or pointer 54 terminating preferably in the representation of a human hand in the index position as indicated at 55. This hand is movable over a graduated scale 56 which is located at the periphery of the opening 18 in the head, this graduated scale indicating pounds of weight. The opposite end portion of the pointer 54 is enlarged to provide a tail 57 for a purpose to be described. Secured upon the shaft 53 between the bars 30 is a gear 58 which meshes with the rack teeth 45 and secured upon the opposite end of the shaft 53 is a ratchet 59.

Cooperating with this ratchet is a pawl 60 formed on one end of an elongated rod 61 pivoted at 62 between two of the uprights 31 and carrying at its free end the scoop like member 63 normally positioned at the lower end of the coin chute 26. A weight 64 is adjustably mounted upon the rod 61 and is adapted to be so positioned as to overbalance the rod so that the pawl end 60 thereof will normally be in engagement with the ratchet 59 except when a coin has been deposited through the chute 26 into the scoop 63, and this rod is so balanced through the medium of the weight 64 that before the rod will return to its normal position it will allow a complete revolution of the ratchet 59 or the time required for such revolution as the case may be.

Extending transversely of the bars 30 are supporting braces 65 which carry an automatic registering device 66 the shaft of which is provided with a pinion 67 meshing with the rack teeth 46 and this register is adapted to be actuated every time that the scale is used so that the owner of the scale may ascertain how many different persons have been weighed.

Rising from the bars 30 is a suitable support 68 upon the upper end of which is a fan shaped plate 69 carrying the legend "Thank you, please call again." Ordinarily this legend plate is covered by the tail portion 57 of the indicator 54 but when the scale has been actuated as will be hereinafter described and the indicator hand 55 swings around to point to the weight of the person standing upon the platform, the tail portion 57 of the indicator will be swung out of obstructing relation to the fan shaped legend plate 69 so that the legend thereon will be displayed to the gaze of the user of the scale. It is also preferable that the segments 37 bear the legend "Stand" and "Still."

The operation of the device is as follows:

A person desiring to ascertain his weight steps upon the platform 21 and then deposits a coin within the coin slot 25. The coin will then roll down the chute 26 and drop into the scoop 63 whereupon the rod 61 will be overbalanced so that the pawl end 60 thereof will be moved out of engagement with the ratchet 59. The weight of the person upon the platform 21 will cause the levers and links 20 to operate to pull down upon the rod 22 and this will of course result in pulling down upon the rod 42, the downward movement of the rod 42 being cushioned or made slow by virtue of the provision of the cylinder 48 and piston 50 operating therein. As the rod 42 is thus moved downwardly the gear teeth 45 thereon meshing with the pinion 58 will cause the pinion to turn and this will of course result in rotation of the shaft 53 and rotation of the pointer member 54 so that the indicating hand 55 carried by the latter will be moved over the graduated scale 56. The action of the engagement of the rack teeth 47 with the toothed peripheries of the segment 38 is to retard the movement of the rod 42 and indicator member 54. The weight of the person upon the platform 21 will of course govern the position or point at which the indicator 54 will come to rest as will be obvious. When the scoop 63 carrying the coin swings downwardly as above described it will cause the coin to slip out into the funnel shaped end 28 of the chute 27 and the coin will pass through the chute 27 and be discharged from the lower end thereof into the hollow pedestal 16 from which it will pass into the receptacle 29 within the base 15. After dropping the coin, the scoop member 63 will be overbalanced at the other side of the pivot and will return to its normal position immediately beneath the lower end of the chute 26. This action cannot be completed however and will have no effect upon the mechanism until the person having ascertained his weight steps off of the platform 21 whereupon the pawl end 60 of the rod 61 will be re-engaged with the ratchet 59 so as to hold the mechanism locked until another coin is deposited. As stated above when the operator or person desiring to be weighed steps upon the platform and deposits the coin the tail end 57 of the indicator moves out of obstructing relation to the legend plate 69. It is also to be observed that every time the device is operated, that is every time the rod 42 is moved downwardly the engagement of the rack teeth 46 thereon with the pinion 67 will cause the register 66 to be operated. This register records the number of persons weighed.

From the foregoing description and a study of the drawings it will be apparent that I have thus provided a comparatively simple and inexpensive weighing machine which will be accurate at all times as there are no links or levers in the main portions thereof to expand or contract depending upon temperature. It is also to be observed that the device will be very attractive in appearance especially as the front and back of the head portions thereof are formed of plate glass discs or sheets so that a person weighing himself may be interested in watching the movement of the mechanism in the device.

While I have shown and described the preferred embodiment of the invention it is of course to be understood that I reserve the right to make such changes in the form, construction and arrangement of parts as will not depart from the spirit of the invention or the scope of the subjoined claims.

Having described my invention I claim:—

1. A weighing machine comprising a base member, a pedestal rising therefrom, a head member upon the upper end of the pedestal, a platform, associated with the base member, a series of pivoted levers and links arranged within the base member and supporting the platform, a rod extending vertically through the pedestal and operatively connected with the levers and links whereby to be moved downwardly when a weight is placed upon the platform, said head member being formed with a relatively large central opening, a scale arranged at the periphery of said opening and designating pounds, a transverse support within the head member at substantially the center thereof, a horizontally disposed shaft journaled upon said support, an indicator mounted upon said shaft and movable over said scale, a gear on said shaft, and rack teeth formed on said rod and meshing with said gear whereby to effect rotation of the latter and consequent rotation of the indicator when weight is placed upon said platform, and coin-controlled means normally holding said shaft against rotation, a pair of supporting members secured upon said transverse support, segments journaled upon said supports and having toothed peripheries, rack teeth formed on the upper portion of said rod and meshing with the toothed peripheries of said segments, arms carried by said segments, and weights on said arms whereby said segments meshing with the second named rack teeth will tend to retard movement of the rod.

2. A weighing machine comprising a base member, a pedestal rising therefrom, a head member upon the upper end of the pedestal, a platform associated with the base member, a series of pivoted levers and links arranged within the base member and supporting the platform, a rod extending vertically through the pedestal and operatively connected with the levers and links whereby to be moved downwardly when a weight is placed upon the platform, said head member being formed with a relatively large central opening, a scale arranged at the periphery of said opening and designating pounds, a transverse support within the head member at substantially the center thereof, a horizontally disposed shaft journaled upon said support, an indicator mounted upon said shaft and movable over said scale, a gear on said shaft, and rack teeth formed on said rod and meshing with said gear whereby to effect rotation of the latter and consequent rotation of the indicator when weight is placed upon said platform, and coin-controlled means normally holding said shaft against rotation, a depending frame carried by said transverse support and through which said rod operates, a piston rod depending from said frame and carrying a piston, and a cylinder carried by said rod and through which said piston operates, said cylinder being filled with a liquid, and the piston therein being formed with a hole whereby to permit flow of the liquid from one side of the piston to the other.

In testimony whereof I affix my signature.

WILLIAM C. HALL.